UNITED STATES PATENT OFFICE.

CHARLES McBURNEY, OF ROXBURY, MASSACHUSETTS.

IMPROVEMENT IN UTILIZING WASTE VULCANIZED RUBBER.

Specification forming part of Letters Patent No. 33,094, dated August 20, 1861; Reissue No. 2,206, dated March 20, 1866.

*To all whom it may concern:*

Be it known that I, CHARLES McBURNEY, of Roxbury, in the county of Norfolk and State of Massachusetts, have invented a new and Imprved Process of Utilizing Waste Vulcanized India-Rubber; and I hereby declare the following to be a full, clear, and exact description of the same, and of the characteristics which distinguish it from anything heretofore known.

The processes heretofore employed for the purpose of reusing waste vulcanized rubber are objectionable, in that expensive chemicals or the submission to steam of a high temperature or superheated steam are necessary to said processes, either of which, to a more or less extent, injure the quality of the material, and in some cases decompose it or burn it, so as to render it useless; besides, this mode of treatment with high or superheated steam is attended with danger, as the rubber is liable to ignite and be destroyed, at the same time endangering the safety of the buildings.

My present invention has for its object to avoid the expensive and dangerous modes of treatment referred to and to restore to the rubber those properties of which it has been deprived by the process of vulcanization to which it had been previously subjected. This I accomplish by adding to the rubber, after it has been suitably comminuted, a portion of some vegetable oil, which, having no solvent action on the rubber, simply restores to it those properties and that capability of being vulcanized which it possessed in the crude state.

To enable those skilled in the art of manufacturing vulcanized-rubber goods to understand my invention, I will describe the process in detail.

Waste scraps or worn-out articles of vulcanized rubber—such as old boots, shoes, car-springs, &c.—are reduced by any suitable process to fine power or dust. This is best accomplished by the ordinary friction-rolls used in grinding crude rubber and mixing rubber compounds. This powder I pack into barrels, (old flour-barrels I find convenient,) sprinkling it very slightly with cold water to cause it to pack in less bulk. I find, too, that the slight dampness softens the rubber and fits it for use after standing in some cool cellar or shed for a few weeks. To render it further suitable for use, I put twenty pounds of the powder (as above prepared) into a set of common friction grinding-rolls with from two to four pounds of crude rubber, grind them thoroughly till well combined, and then gradually mix in from three to five pounds of oil—such as cotton-seed oil, olive-oil, castor-oil, palm-oil, or cocoa-nut oil. These amalgamate completely, forming a valuable compound, which can be used in the manufacture of many kinds of vulcanized-rubber goods. In order the more perfectly to prepare this compound for use I submit it to a low steam heat (not exceeding 230° Fahrenheit) for from four to ten hours. Thus it is obvious to any one having a knowledge of the art of manufacturing vulcanized rubber that the compound produced has in no way been subjected to a decomposing or injurious process; but, on the contrary, that a new and valuable product is formed which may be extensively used in connection with other rubber compounds.

The proportions above given may be varied; but they are what I find in practice to be good, and I think the best.

I am aware that oils have been used in the manufacture of rubber, but this has been done with an entirely different object and result. I therefore lay no claim to such employment of fixed vegetable oils; neither do I lay claim to any essential oils or other solvents for the purpose of restoring waste vulcanized rubber, for I do not use such oils or solvents.

What I claim as my invention, and desire to secure by Letters Patent, is—

The use of the oils mentioned, in combination with waste vulcanized rubber and crude gum or rubber, as set forth, for the purpose specified.

In testimony whereof I have signed my name to this specification before two subscribing witnesses.

CHARLES McBURNEY.

Witnesses:

H. H. McBURNEY,

JAMES WILSON.